Patented Dec. 8, 1925.

1,564,660

UNITED STATES PATENT OFFICE.

HEINRICH FASSBENDER, OF CHARLOTTENBURG, AND ERICH HABANN, OF BERLIN, GERMANY, ASSIGNORS TO DEUTSCHE TELEPHONWERKE G. M. B. H., OF BERLIN, GERMANY.

HIGH-FREQUENCY-CABLE TELEGRAPHY.

Application filed August 22, 1921. Serial No. 494,388.

(GRANTED UNDER THE PROVISIONS OF THE ACT OF MARCH 3, 1921 41 STAT. L., 1313.)

*To all whom it may concern:*

Be it known that we, HEINRICH FASSBENDER and ERICH HABANN, both German citizens, and residing at Charlottenburg, Germany, and Berlin, Germany, respectively, have invented certain new and useful Improvements in High-Frequency-Cable Telegraphy, and applications for which have been filed in Germany October 14, 1919, patented November 13, 1920, No. 329,068, and in Switzerland October 14, 1919, Holland May 29, 1920, Sweden March 30, 1920, and Great Britain March 24, 1921, and of which the following is a specification.

For the working on telegraph lines with high frequency waves it is necessary that the signal receiving apparatus, which responds to the said waves coming over the line or antenna, converts a received one-wave-train into a continuous current in order to cause a relay to respond thereto, the relay, for example, being that of a Morse telegraph instrument.

The invention has for its object to facilitate the method of effecting the conversion and to simplify the apparatus which is required for this purpose.

In order to effect the said conversion it has hitherto been suggested to insert behind the receiving tube used in the usual manner and which amplifies the high frequency alternating current received, a unidirectional device (detector, rectifying tube) and then behind this the relay of the telegraphic receiving instrument. According to the present invention the said relay arranged in parallel with a condenser (or more generally in combination with a capacity), is directly inserted in the anode circuit of the said amplying tube and the latter is arranged in the manner of the known audion.

The tube therefore is not provided with a battery in its grid circuit which receives the incoming alternating currents as is usual with rectifying tubes as above referred to, but only contains as in the case of the known audion of De Forest a high resistance arranged in parallel with a small condenser. In the anode circuit is provided an anode battery and in series therewith the relay of the telegraphic instrument which is tuned to the direct current and has a capacity arranged in parallel to its winding.

Figure 1:
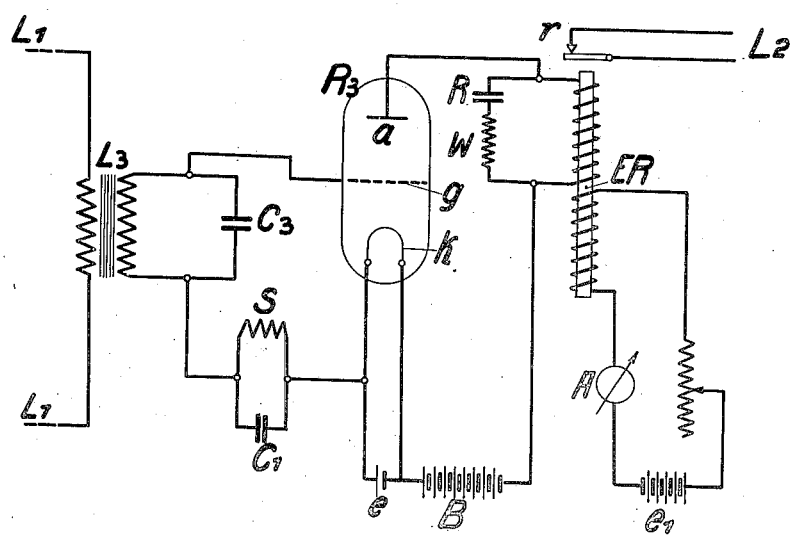
Figure 2:
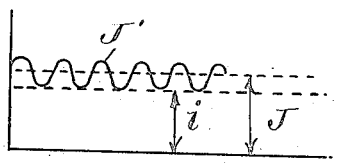

In the accompanying drawing Figure 1 illustrates a circuit diagram according to the present invention, and Figure 2 is a diagram showing the current-components in the relay circuit.

Referring to the drawing $R_3$ indicates the audion in which $a$ indicates the anode, $g$ the grid, $k$ the glowing cathode, and $e$ the heating battery for the latter. The grid circuit of the audion includes an oscillating circuit consisting of the self-induction $L_3$ and the capacity $C_3$. By means of this circuit the audion receives the alternating currents from the line $L_1$. For this purpose it is coupled to the line $L_1$ by means of a transformer of which the secondary winding is formed by the said self-induction coil $L_3$. In the grid circuit of the audion is also disposed the said high ohmic resistance $s$ and parallel thereto is arranged a small condenser $C'$. The capacity of this condenser must be such that it prevents the passage of the incoming high frequency current.

In the anode circuit of the audion is included an anode battery B, the main winding of a relay ER and parallel to this a condenser R in series with a high resistance W.

The relay ER is provided with an opposite winding (at the bottom) which may be supplied with an adjustable current from the battery $E_1$. A is an ammeter which indicates the magnitude of this current. The armature of the relay normally lies against the raised contact $v$ and thus maintains the line $L_2$ closed, this line leading to the electromagnet (not shown) of a telegraphic receiver through a battery which is also not shown in the drawing.

The method of operation is as follows:

The audion amplifies the alternating current which it receives by means of the oscillating circuit $L_3$ $C_3$. (It is assumed that the alternating current flowing in $L_1$ is of low frequency so that the transformer may be provided with an iron core.) As long as no frequency current is received a constant continuous current from the battery B flows in the anode-circuit, this current, however, being ineffective on the relay-armature, as it is opposed with equal strength by the counter-winding of the relay. As soon as frequency waves are received in the grid-circuit of the tube, pulsations of current are introduced into the said anode-circuit, these pulsations having a low frequency, for example 1000 alternations per second. Now in the anode circuit as a whole there flows a current which is composed of the continuous current of the battery and the superimposed frequency current. The total current is a pulsating continuous one. The alternating-current component of this pulsating current flows through the condenser R and resistance W, as this component does not pass through the relay winding by reason of self-induction, but passes along the more convenient path through the condenser R and resistance W. Only the continuous-current component flows through the relay-winding, and the latter component by being smaller than the original battery-current destroys the balance of the relay and the relay-armature is attracted by the predominant force of the (lower) counter-winding. The armature then breaks the contact $r$ and the flow of current in the receiver-circuit $L_2$ ceases, so that the receiver is actuated.

The said partition and composition of currents is shown in Fig. 2. The current J is that flowing originally in the anode-circuit. When pulsations are introduced into this circuit by tube-action a pulsating current J' is produced in this circuit, this pulsating current consisting of a continuous current-component $i$ and a superimposed alternating current. The latter flows through the condenser-path, the former ($i$) through the relay winding. Fig. 2 shows that the current $i$ is smaller than the current J. In the foregoing the armature of the relay ER is so adjusted that by reason of the opposite winding of the upper and lower windings of the relay ER it is normally not attracted and maintains the contact of the line $L_2$ closed, but is attracted when less current flows through the upper winding as the current in the lower winding will now exert the maximum attraction. The arrangement could also be such that the armature is polarized and closes the contact when attracted. By causing the two windings to counteract it is possible to obtain an extremely accurate and sensitive adjustment of the relay.

The condenser R may be omitted when the windings of the upper relay winding have a sufficient relative capacity. The capacity of this condenser R (or of the upper relay winding) must be of such magnitude that it permits of the passage of the alternating current of the corresponding frequency as will be clear from the foregoing.

By arranging the tube $R_3$ as an audion the battery which is otherwise required in the grid circuit by a rectifying tube is made unnecessary thus facilitating the relative adjustment of the batteries $e_1$ and B as regards their action on the relay ER.

The high resistance W is for the purpose of eliminating certain disturbances, and may be arranged as aforesaid even when the condenser R is omitted.

For example when operating a Hughes apparatus over line $L_2$ by the relay ER it has been found that certain signal groups placed close together on the Hughes key board, for example, the combination *int*, which generally serves as the test group for the synchronism of the Hughes apparatus of both corresponding stations at the commencement of the correspondence is correctly received for some time by the Hughes apparatus of the receiving station, but after a period it passes on to the next group of letters and therefore *int* is changed to *jua*. This may to a certain extent be due to a sluggishness of the relay. Experiments have shown that this disturbing action can be entirely obviated if in parallel to the relay winding in series with the condenser above referred to, a high ohmic resistance W is provided, this resistance having a value of nearly 10,000 ohms. In this manner a thorough transmission free from error is attained for the group *int* and for all other closely allied signal groups.

Having thus described our invention what we claim as new and desire to secure by Letters Patent is:—

1. In a high frequency telegraph system, the combination comprising an audion-tube serving as thermionic valve, which receives the incoming frequency currents, a relay responding to continuous current and controlling the circuit of the telegraphic receiving instrument, this relay being switched in the anode circuit of the audion and a capacity arranged in parallel with the relay winding and dimensioned in such a manner that it reduces the continuous anode current which flows through the relay in the time when no communication takes place, so that by this reduction the relay responds to the incoming telegraphic signs.

2. In a high frequency telegraph system, the combination comprising an audion tube serving as thermionic valve, which receives the incoming frequency currents, a relay responding to continuous current and controlling the circuit of the telegraphic receiving instrument, this relay being switched in the anode circuit of the audion, an auxiliary winding on said relay for supplying current to the same so that it differentially acts upon its armature and the capacity arranged in parallel with the relay winding and dimensioned in such a manner that it reduces the continuous anode current which flows through the relay in the time when no communication takes place, so that by this reduction the relay responds to the incoming telegraphic signs.

3. In a high frequency telegraph system, the combination comprising an audion tube serving as thermionic valve, which receives the incoming frequency currents, a relay responding to continuous current and controlling the circuit of the telegraphic receiving instrument, this relay being switched in the anode circuit of the audion, and a capacity arranged in series with a high ohmic resistance and in parallel with the relay winding and dimensioned in such a manner that it reduces the continuous anode current which flows through the relay in the time when no communication takes place, so that by this reduction the relay responds to the incoming telegraphic signs.

4. In a high frequency telegraphic system, the combination comprising an audion tube serving as thermionic valve, which receives the incoming frequency currents, a relay responding to continuous current and controlling the circuit of the telegraphic receiving instrument, this relay being switched in the anode circuit of the audion, an auxiliary winding on said relay for supplying current to the same so that it differentially acts upon its armature and a capacity arranged in series with a high ohmic resistance and in parallel with the relay winding and dimensioned in such a manner that it reduces the continuous anode current which flows through the relay in the time when no communication takes place, so that by this reduction the relay responds to the incoming telegraphic signs.

PROF. DR. HEINR. FASSBENDER.
ERICH HABANN.